March 22, 1966 W. KOBER 3,242,365
GENERATOR VOLTAGE CONTROL
Original Filed Oct. 3, 1955 3 Sheets-Sheet 1

INVENTOR.
WILLIAM KOBER
BY:
Christel + Bean
ATTORNEYS.

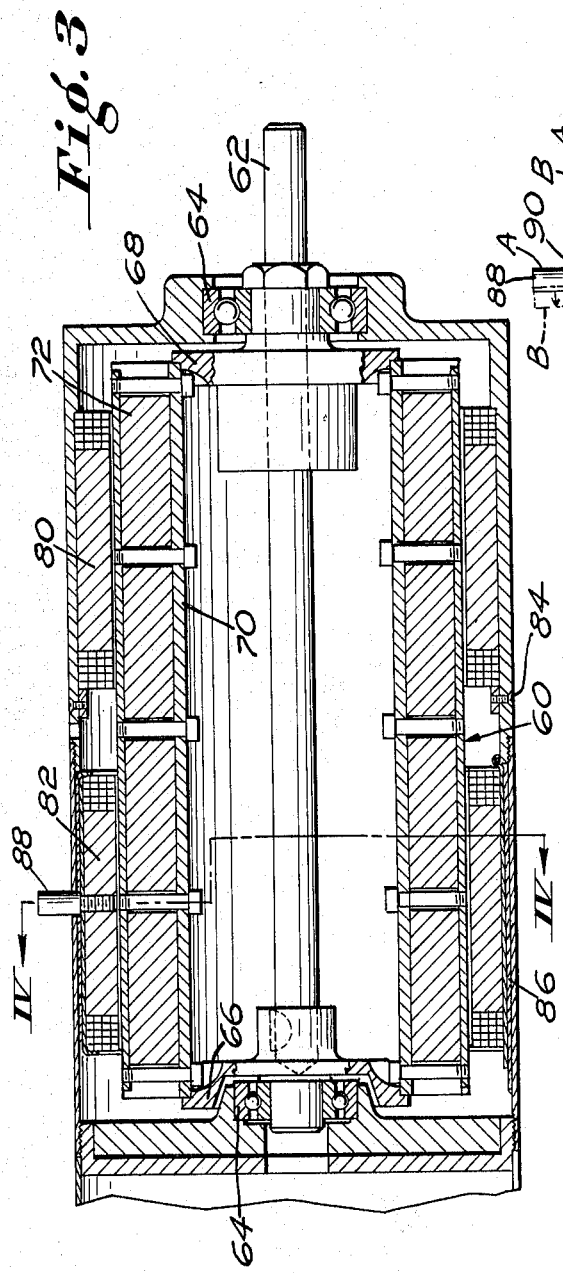
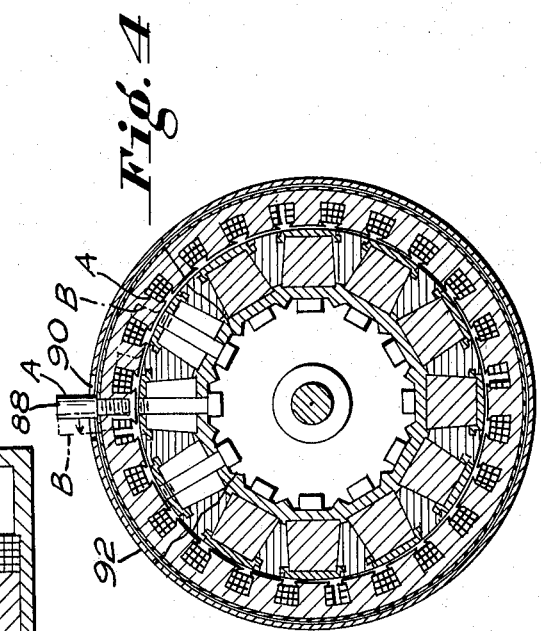
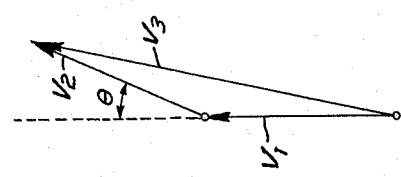
Fig. 3
Fig. 4
Fig. 5
INVENTOR:
WILLIAM KOBER
BY
Christel & Bean
ATTORNEYS.

March 22, 1966 W. KOBER 3,242,365
GENERATOR VOLTAGE CONTROL
Original Filed Oct. 3, 1955 3 Sheets-Sheet 3
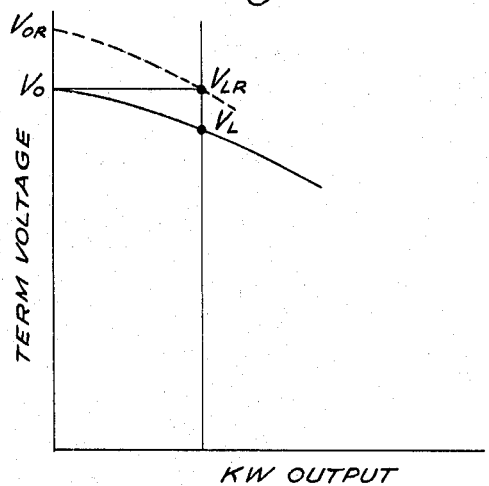
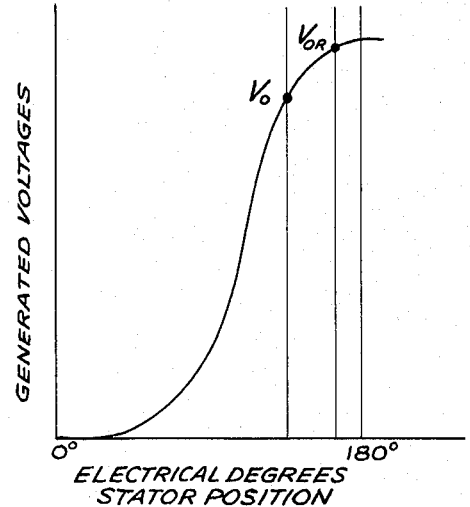
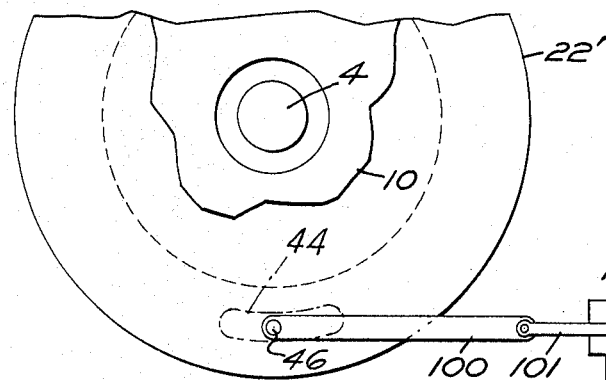
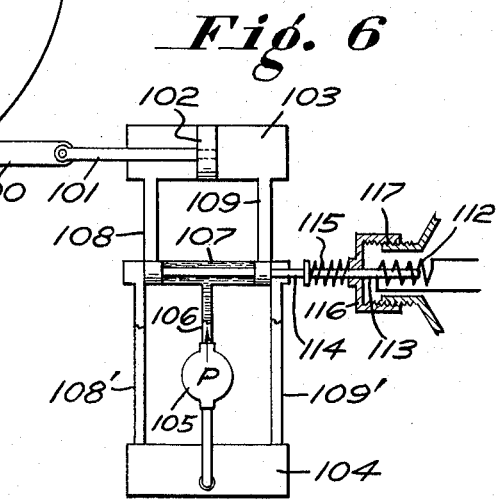
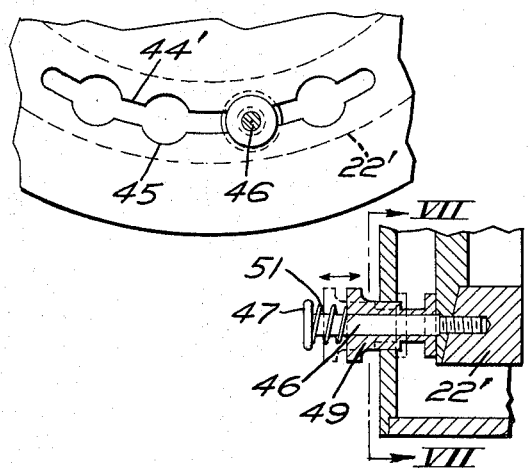
INVENTOR:
WILLIAM KOBER
BY
Christel & Bean
ATTORNEYS.

United States Patent Office 3,242,365
Patented Mar. 22, 1966

3,242,365
GENERATOR VOLTAGE CONTROL
William Kober, Fairport, N.Y., assignor, by mesne assignments, to The Garrett Corporation, Los Angeles, Calif., a corporation of California
Continuation of application Ser. No. 537,973, Oct. 3, 1955. This application Nov. 5, 1962, Ser. No. 235,274
9 Claims. (Cl. 310—268)

This invention relates generally to the art of electric power generation, and more specifically to a new and useful generator voltage control arrangement. This application is a continuation of my application Serial No. 537,973, filed October 3, 1955.

In my Patents 2,719,931; 2,824,275; 2,892,144; 2,784,-332; and 2,861,238 I disclose an axial air gap generator having a rotating, permanent magnet field, and arrangements for varying the length of the air gap, by moving one of the rotor and stator toward and away from the other, to control the output voltage of the generator, this control being accomplished either manually, automatically in response to the generator output, or automatically in response to an internal operating characteristic such as the torque produced on the stator by the electrical load on the generator.

However, in some instances, such as with a multiple ended, axial air gap generator, variation in air gap length is not desired, and accordingly it is a primary object of my invention to provide a means for controlling the output voltage of a generator either manually, automatically in response to output voltage, or automatically in response to an internal operating characteristic, which can be accomplished without varying the length of the air gap.

While this invention is primarily concerned with controlling the output voltage of a multiple ended, axial air gap, permanent magnet generator of the type disclosed in my Patent 2,873,395, without varying the length of the air gap, it is also applicable to other generators such as, for example, those of the radial air gap type.

In its broadest aspect, a generator output voltage control in accordance with my invention is characterized by a dynamoelectric generator having a rotor and two or more stator sections, and means mounting one of the stator sections for movement relative to the other thereof about the axis of rotor rotation to vary the electrical phase relation therebetween and thereby vary the generator output voltage. Further, in accordance with my invention this control movement is accomplished either manually, automatically under the control of the generator output, or in response to electrical load produced torque variations on the moving stator section.

The foregoing and other objects, advantages and characterizing features of a generator voltage control arrangement in accord with my invention will become clearly apparent from the ensuing detailed description, taken together with the accompanying drawings forming a part thereof wherein:

FIG. 3 is a longitudinal sectional view of a radial air gap generator constructed in accordance with my invention;

FIG. 4 is a transverse sectional view taken about on line IV—IV of FIG. 3;

FIG. 5 is a schematic view comprising a vector diagram illustrating the operation of my generator voltage control;

FIG. 6 is a schematic view showing one type of control action;

FIGS. 7 and 8 are fragmentary front and sectional views, respectively, the former being taken about on line VII—VII of the latter, showing one type of manual control; and FIGS. 9 and 10 are additional schematic views illustrating the operation of my generator control.

Figure 1:
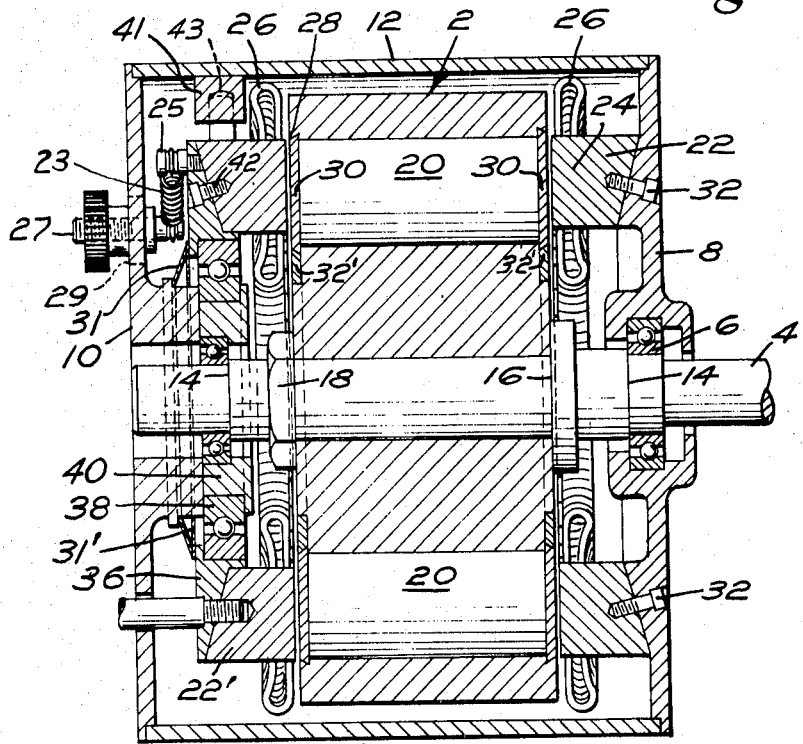
FIG. 1 is a longitudinal sectional view of a multiple ended, axial air gap, generator constructed in accordance with my invention, being taken about on line I—I of FIG. 2.
Figure 2:
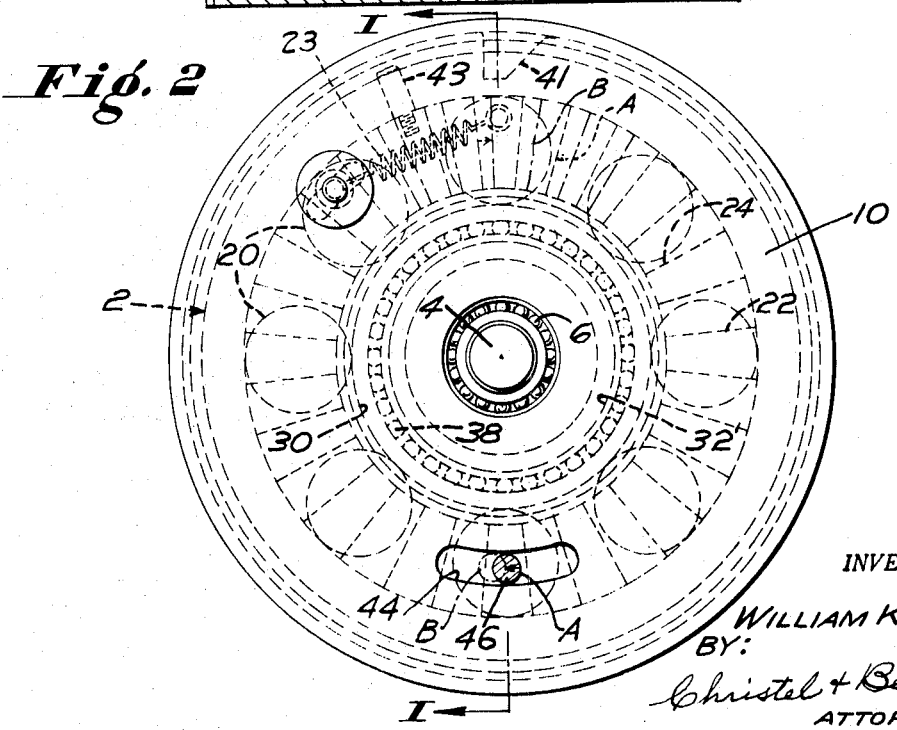
FIG. 2 is an end elevational view thereof.

Looking now at the embodiment illustrated in FIGS. 1 and 2, the preferred axial air gap, permanent magnet generator illustrated therein has a rotor, generally designated 2, which comprises a permanent magnet field structure mounted on a shaft 4 which is journaled for rotation in bearing structures 6 carried by the opposite end plates 8 and 10 of the generator casing. The generator casing also includes a cylindrical sleeve 12 to complete the enclosure, the end plates 8 and 10 being secured thereto in any desired manner, as for example by threading thereinto.

Shaft 4 is shouldered, as at 14, to position the same with respect to the bearings 6, and at one end thereof the rotor 2 bears against a shoulder 16 formed on shaft 4, a nut 18 being threaded on the shaft and bearing against the opposite end of the rotor to position the same in the casing.

In accordance with my earlier invention, rotor 2 comprises a body member formed of a material characterized both by a high degree of electrical conductivity and a high degree of mechanical strength such as, for example, wrought duralumin, which body member is broached, drilled or otherwise formed to provide holes for receiving the permanent magnets 20 in substantial parallelism with the axis of rotation as defined by the shaft 4. Thus, the rotor body surrounds the magnets throughout their length and provides a protective path of high electrical conductivity encircling the same while mechanically supporting the magnets in a manner enabling extremely high speeds of rotation.

In accordance with my multiple ended, axial air gap construction, a pole piece structure is provided at each end of the rotor 2, and a stator armature section is operatively associated with each such pole piece structure. Thus, I provide two separate armature structures 22 and 22' having their working faces spaced axially from the opposite ends of the rotor 2, each stator being provided with teeth 24 having a winding 26 in the slots between the teeth and being formed to provide a flat working surface facing the adjacent rotor end in substantial parallelism with the pole piece structure thereat. The windings 26 are connected in series, as indicated by the vector diagram of FIG. 5.

The pole piece structures can comprise in each instance an annular lip 28 formed integrally with the rotor body adjacent the periphery thereof and undercut to receive thereunder the beveled outer edges of pole pieces 30 which are positioned over the opposite end faces of the magnets 20. The pole pieces are then held against the magnets as by retainer plates 32' having an undercut periphery overlying the beveled inner edges of the pole pieces.

In accordance with the instant invention, I control the generator output voltage by varying the electrical phase displacement between the stator sections, by moving one of the stator sections relative to the other thereof about the axis of rotor rotation.

To this end, whereas one stator section 22 is secured directly to the relatively fixed end plate 8, as by the screws 32, the other stator section 22' is secured, as by screws 42, to a mounting plate 36 which is journaled on bearings 38 carried by an inwardly extending boss 40 on the end plate 10. It will be appreciated that insofar as armature structure is concerned, stator sections 22 and 22' are identical, the prime to be used only to identify the relatively movable stator section. With this arrangement, the stator section 22′ is mounted for movement relative to the stator section 22 about the axis of rotor rotation defined by the shaft 4 to selectively vary the electrical phase displacement therebetween and consequently the output voltage of the generator, and this position adjusting movement can be accomplished manually, automatically in response to an internal operating characteristic of the generator, or by external driving means operable, for example, automatically in response to generator output.

Looking now at the vector diagram of FIG. 5, the vector $V_1$ represents the output voltage of the fixed stator section 22, while the vector $V_2$ represents the output voltage of the movable stator section 22′. The sum total of these voltages is represented by the vector $V_3$.

By the cosine solution of the triangle $V_1$, $V_2$, $V_3$, $$V_3^2 = V_1^2 + V_2^2 + 2V_1V_2 \cos \theta$$

normally, $V_1$ and $V_2$ are equal, and if $V_m$ is the maximum value of $V_3$, then $$V_1 = V_2 = \frac{V_m}{2}$$

hence $$V_3^2 = \frac{V_m^2}{2}(1 + \cos \theta)$$

It will be seen, therefore, that by varying the phase angle $\theta$ between the stator sections the total output voltage $V_3$ can be varied from a maximum equal to $V_1 + V_2$ to a minimum of $V_1 - V_2$.

FIG. 2 shows one position of the movable stator section 22′ in full lines, and an alternate position thereof in broken lines, and it will be appreciated that movement of the stator section between said positions serves to vary the electrical angle between that stator section and the fixed stator section thereby to vary the output voltage $V_3$.

This is shown in another way in FIGS. 9 and 10.

FIG. 10 shows the no load, or generated voltage as a function of the relative position of the stator sections, expressed in electrical degrees. FIG. 9 shows the terminal voltage as a function of the electrical power output of the generator. Thus, for an arbitrary stator position which results in delivering an output voltage $V_O$, FIG. 10, we have the load curve $V_O - V_L$, of FIG. 9, and for a different stator position labeled $V_{OR}$, FIG. 10, we have a different load curve $V_{OR} - V_{LR}$, FIG. 9. For a given kilowatt load represented by the vertical line passing through points $V_L$ and $V_{LR}$ in FIG. 9, various output voltages are possible depending upon the relative positions of the two armatures. The voltage $V_L$ would occur at this given load if an armature could not rotate to bring the voltages more into phase, i.e., if no compensation were present. However, one armature can move to compensate for an increased load, and when it has moved to a compensating position represented in FIG. 10 by the point $V_{LR}$ the generator will be operating on a new curve $V_{OR} - V_{LR}$ thereby providing an output voltage $V_{LR}$. FIG. 9 shows $V_{LR}$ is equal to $V_O$, thus indicating correct compensation.

It will be noticed that load curves $V_O - V_L$, and $V_{OR} - V_{LR}$, are not parallel. This is because of the unique property of this type of regulation, used on this type of generator, that the reactance decreases as the stator position is set for a lower voltage. This is easily seen from the fact that the total armature reaction of the two stator sections is reduced as the phase relation therebetween is reduced.

Preferably, the output voltage is controlled automatically in response to the internal torque produced on stator section 22′ by the electrical load on the generator.

This type of automatic voltage control is possible because, as set forth in my said Patent 2,824,275, a large rotational force on the stator results from the application of a power drain to the generator output. This is most conveniently viewed as being the back torque or power absorption by the stator, which appears in the form of electrical energy, and if the winding and associated losses in the generator as well as the output load are taken into account, this view is quite accurate. Assuming an efficiency of 90% (10% internal losses), and output power P, the rotational torque T in pounds-feet on the stator is given by the relation $$T = \frac{P}{n} \times \frac{33,000}{2\pi \times 0.746 \times 0.9} = \frac{P}{n} \times 7823$$

where $n$ is the number of revolutions per minute. This equation is only approximate, since at low power factors internal losses increase and the efficiency drops, so that the torque is not entirely proportional to output power but has some tendency to follow the current value, but the relation is such that good regulation is possible.

When the electrical load on the generator increases, the output voltage drops, and in accordance with this invention, in this form thereof, the torque on the stator section 22′, which torque varies with the output voltage, is utilized to produce rotation of the one stator section 22′ relative to the other to vary the phase displacement thereof in a manner tending to increase the total output voltage. This torque producing motion is resisted by an elastic support, which is adjustable, to provide a further control, and damping is introduced to avoid oscillating of the movable stator section.

Thus, when it is desired to control the position of the movable stator section 22′ automatically in response to the torque thereon produced by the electrical load on the generator, I provide elastic restraining means in the form of one or more springs 23 which can be coil springs fastened at one end to the stator section 22′ by the pin 25, and fastened to the end plate 10 by the pin 27. The springs 23 are arranged to elastically resist torque produced movement of the stator section 22′, and the pin 27 can be adjustable, as by the pin and slot connection 29, to selectively adjust the tension on the springs 23 and thereby control the degree of restraining force on the stator. The springs 23 can be arranged so that their effective lever arm varies as stator section 22′ is rotated, to provide a non-linear control motion, or non-linear springs can be used.

Also, to prevent oscillation and undesired hunting, I deliberately introduce damping against the movable stator section 22′, which can be accomplished for example by the provision of friction by a dish shaped spring 31 bearing resiliently against a friction washer 31′, stator section 2′ and against the end plate 10. Of course, other means of introducing friction could be used, such as a spring-backed brake shoe bearing against the stator section 22′, or other means of damping by the use of heavy grease on the bearings 38, or the use of a check or snubber.

If stator section 22′ moves beyond an angle $\theta$ of 180° (FIG. 5), the voltage $V_3$ will begin to decrease. To avoid entering this region a stop 41 is provided on the generator casing in the path of a projection 43 on the stator section 22′, to define the limit of $\theta$ in the neighborhood of 180°.

Where it is desired that the control be accomplished externally of the generator, for example moving the rolling stator 22′ automatically in response to variations in the generator output, a system such as shown schematically in FIG. 6 can be used. Here, a link 100 is pivotally connected at one end to an arm 46 extending from the stator section 22′ through an arcuate slot 44 in end plate 10, and at its other end to a piston rod 101 which is in turn connected to a piston 102 movable within a cylinder 103, and comprising therewith a fluid pressure motor. The piston is moved by fluid pressure differential thereacross, and in the illustrated embodiment, I prefer to use a fluid such as oil, pumped from a reservoir 104 as by the pump 105 which can be driven from the generator shaft for delivering oil under pressure through the conduit 106 to a valve 107, from which the oil is selectively directed through either of conduits 108 and 109 to one side or the other of the piston 102.

The passage of fluid to the motor cylinder 103 is controlled by the valve member 107 which is actuated by, for example, a solenoid 112 operatively connected to the generator output for being actuated in accord therewith. To this end, the solenoid 112 can have an armature 113 connected to the valve member 107 by the shaft 114, for retracting said shaft against the biasing action of a spring 115 having an adjustably positioned base 116 permitting adjustment of spring tension by the threads 117.

Thus, when the generator is activated pump 105 will begin pumping fluid, but spring 115 is adjusted so that when the generator output is at the desired value it balances the retracting action of solenoid 112 at a point where valve member 107 shut off both conduits 108 and 109 from the supply conduit 106. However, upon a variation in the generator output valve member 107 will move in one direction or the other, depending upon whether the variation is above or below the desired value of the output voltage, whereby oil will be pumped through one of the conduits 108, 109 to one side of piston 102, with fluid on the other side thereof being returned through the other of said conduits and through one of the return conduits 108', 109' to the supply reservoir 104. The fluid pressure differential across piston 102 causes it to move stator section 22' about the rotor axis in a direction to restore the output voltage to the predetermined desired value. The end limits of movement of section 22' are determined by piston 102 passing beyond openings 108, 109.

Fluids other than oil can be used, and other types of driving arrangements could be used. Also, where the automatic control just described is used, the torque responsive control can be eliminated, and vice versa.

Also, it is contemplated that perhaps only a simple manual control, for purposes of providing an initial adjustment and selective adjustments thereafter, might be utilized.

In that event, an arrangement such as shown in FIGS. 7 and 8 could be provided, wherein the shaft 46 extends through an arcuate slot 44' having opposed recesses 45 on opposite sides thereof. At its outer end, shaft 46 will be provided with an enlarged head 47, and a collar 49 will be slidable on shaft 46 and biased toward stator 22' by a spring 51 extending between the head 47 and the collar 49. The collar 49 is of a size to engage in an opposed pair of recesses 45 and prevent movement of shaft 46 along the arcuate slot 44' until collar 49 is retracted against spring 51 out of the opposed recesses 45. This automatically locks the stator 22' in the position to which it is manually adjusted.

In addition to the double ended construction shown in FIGS. 1 and 2, it will be appreciated that my invention is applicable to a multiple ended machine utilizing additional rotor and stator parts, to provide voltage control thereof.

Also, while I prefer the axial air gap type of machine, and find my control invention particularly valuable in connection therewith, the same is also useable with a radial air gap construction.

Thus, looking now at FIGS. 3 and 4, there is shown a radial air gap machine comprising a rotor 60 carried by a shaft 62 which is journaled for rotation on bearings 64 and rotor 60 has opposite end caps 66 and 68 mounting an inner sleeve 70 of multiple, flat-sided form on which are positioned the various magnets 72. Two stator sections 80 and 82 are provided, the stator section 80 being held in position as by the screws 84.

The stator section 82, on the other hand, is carried by a bushing member 86 for rotation about the axis of rotor rotation, defined by the shaft 62, relative to stator section 80, and it will be appreciated that control movements thereof can be accomplished by any of the means discussed above in connection with the axial air gap generator.

Thus, for example, where control is accomplished externally a shaft 88 can extend from stator section 82 through an arcuate slot 90 in casing part 92.

While I have shown only certain forms of my invention, I do not necessarily intend to be limited to the details thereof but instead I intend that my invention be defined by the appended claims.

Having completely disclosed and fully described my invention, together with its mode of operation, what I claim as new is:

1. In an electric generator, a rotating field structure, at least two armature structures each having a winding thereon, said armature windings being connected so that the voltages induced therein are combined to produce an output voltage, and means mounting one of said armature structures for rotation with its winding relative to the other of said armature structures and its winding about the axis of rotation of said field structure to vary the relative phase of the respective voltages induced in said armature windings and thereby vary the generator output voltage, together with means biasing said one armature structure out of phase relative to said other armature structure under no load and means for so rotating said one armature structure automatically in response to an operating characteristic of said generator for decreasing the out of phase relation between said armature structures as the electrical load on said generator increases.

2. In an electric generator, a rotating field structure, at least two armature structures, said armature structures having individual windings connected so that the respective voltages induced therein are combined to produce an output voltage, means mounting one of said armature structures and its winding for rotation relative to the other of said armature structures and its winding about the axis of rotation of said field structure to vary the relative phase displacement of the voltages induced in said respective armature windings and thereby vary the generator output voltage, said one armature structure being mounted for such rotation relative to the other thereof in response to variations in the internal torque thereon produced by variations in the electrical load on the generator, and means biasing said one armature structure out of phase relation to said other armature structure under no load conditions.

3. A generator as set forth in claim 2, together with means for adjusting the force of said biasing means.

4. A generator as set forth in claim 2, together with means damping movement of said one armature structure to prevent undesired hunting and oscillation thereof.

5. A generator as set forth in claim 2, together with stop means limiting movement of said one armature structure to a full in phase position to said other armature structure.

6. An axial air gap electric generator having a rotating field structure and an armature structure adjacent each end thereof, said armature structures having individual windings connected so that the respective voltage components induced therein are combined to produce a resultant output voltage, said field structure being common to said armature structures and said armature and field structures having working faces spaced apart along the axis of field rotation to define a multiple ended axial air gap machine, said field structure presenting alternating north and south poles to said air gaps, and means mounting one of said armature structures and its winding for movement about said axis relative to the other of said armature structures and its winding to vary the electric phase displacement between the respective voltage components induced in said armature windings and thereby vary the output voltage of said generator, together with means biasing said one armature structure out of phase relative to said other armature structure under no load conditions, and operating-characteristic responsive means for moving said one armature structure in a direction bringing said armature voltage components in phase as the electrical output of said generator increases.

7. An axial air gap electric generator having a rotating field structure and an armature structure adjacent each end thereof, said field structure being common to said armature structures and said armature and field structures having working faces spaced apart along the axis of field rotation to define a multiple ended axial air gap machine, said armature structures having separate windings connected so that the respective voltages induced therein are combined to produce a resultant output voltage, and means mounting one of said armature structures and its winding for movement about said axis relative to the other of said armature structures and its winding to vary the electric phase displacement between the voltages induced in the respective windings of said armature structures and thereby vary the output voltage of said generator, said one armature structure being mounted for such movement about said axis automatically in response to variations in the internal torque thereon produced by variations in the electrical load on said generator, and means biasing said one armature structure out of phase relative to said other armature structure under no load conditions, said one armature structure moving into phase with said other armature structure as the electrical load on said generator increases.

8. In an electric generator, a field, at least two armature sections each having a winding, said windings being connected so as to combine the respective voltages induced therein into a resultant output voltage, and means mounting one of said armature sections and its winding for movement relative to the other of said armature sections and its winding to vary the relative electrical position of the windings and thereby vary the relative phase of the voltages induced therein to vary the output voltage of the generator, together with means biasing said one armature section out of phase relative to said other armature section, and means for so moving said one armature section against said biasing means to decrease the out of phase relation between said sections automatically in response to a decrease in the generator output voltage.

9. In an electric generator, a rotating field structure, at least two armature structures each having a winding thereon, said armature windings being connected so that the voltages induced therein are combined to produce an output voltage, means mounting one of said armature structures for movement relative to the other of said armature structures to vary the relative phase of the respective voltages induced in said armature windings and thereby vary the generator output voltage, means biasing said one armature structure out of phase relative to said other armature structure under no load conditions, and means for so moving said one armature structure automatically in response to an operating characteristic of said generator for decreasing the out of phase relation between said armature structures as the electrical load on said generator increases.

References Cited by the Examiner

UNITED STATES PATENTS

| | | | |
|---|---|---|---|
| 514,903 | 2/1894 | Bradley | 318—197 |
| 1,813,496 | 7/1931 | Kennedy et al. | 322—52 |
| 2,524,361 | 10/1950 | Sawyer et al. | 310—112 |
| 2,573,283 | 10/1951 | Seitz | 310—268 X |
| 2,824,275 | 2/1958 | Kober | 322—27 |
| 2,873,395 | 2/1959 | Kober | 310—112 |

FOREIGN PATENTS

| | | |
|---|---|---|
| 714,430 | 8/1954 | Great Britain. |

MILTON O. HIRSHFIELD, *Primary Examiner.*